F. C. PREIFERT & F. SCHULZ.
AUTOMOBILE JACK.
APPLICATION FILED JAN. 24, 1917.
1,254,352.
Patented Jan. 22, 1918.
2 SHEETS—SHEET 1.
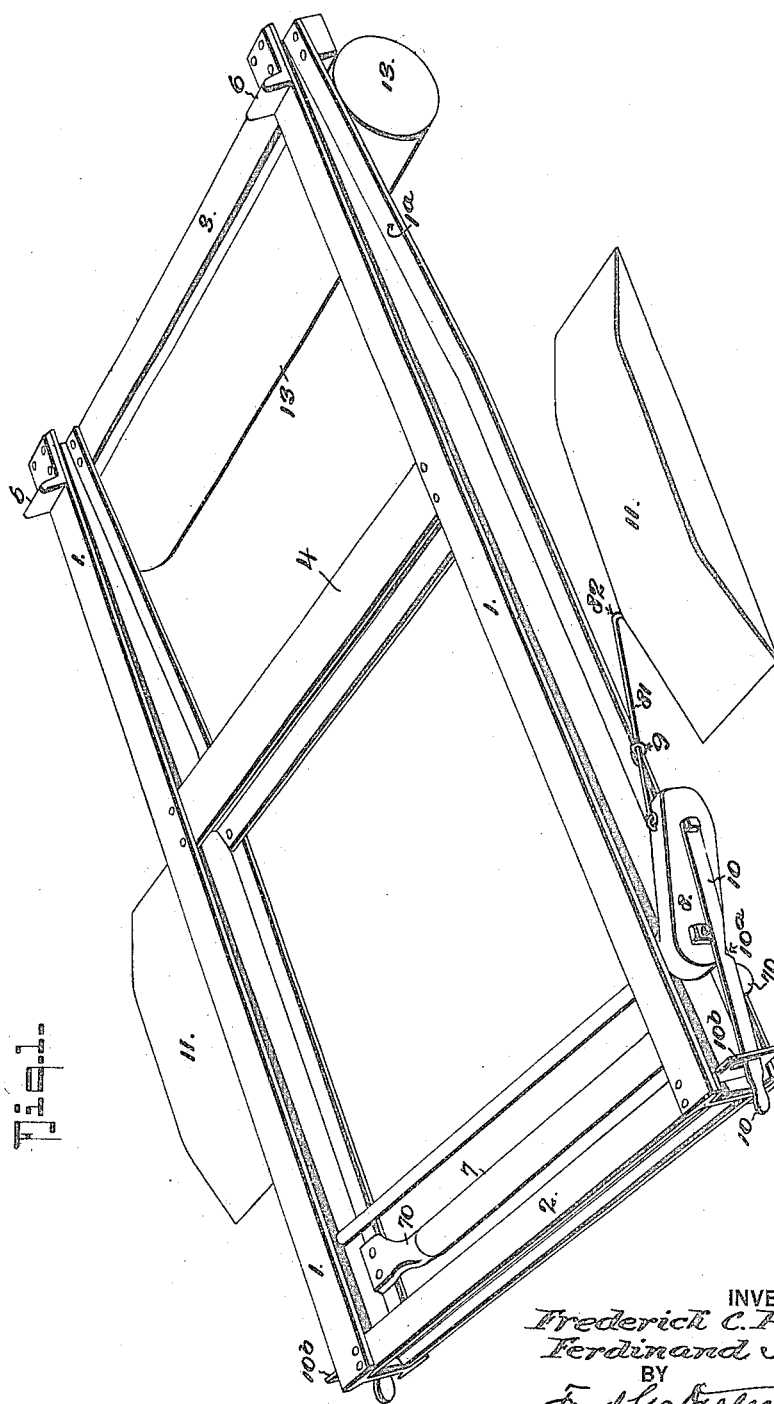
INVENTORS
Frederick C. Preifert,
Ferdinand Schulz,
BY
Fred G. Dieterich
ATTORNEYS

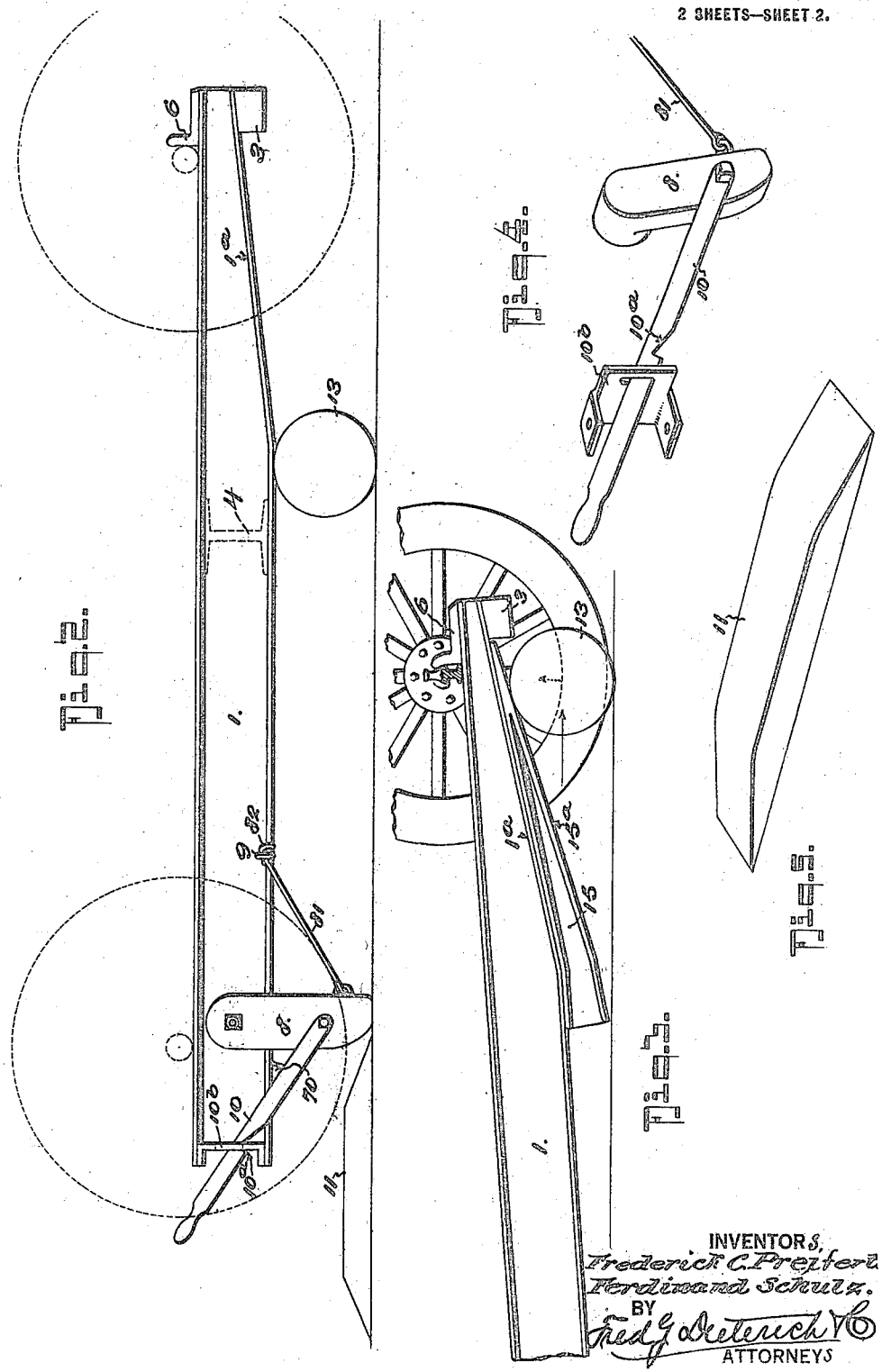

UNITED STATES PATENT OFFICE.

FREDERICK C. PREIFERT AND FERDINAND SCHULZ, OF BEAVER CROSSING, NEBRASKA.

AUTOMOBILE-JACK.

1,254,352.  Specification of Letters Patent.  Patented Jan. 22, 1918.

Application filed January 24, 1917. Serial No. 144,263.

*To all whom it may concern:*

Be it known that we, FREDERICK C. PREIFERT and FERDINAND SCHULZ, residing at Beaver Crossing, in the county of Seward and State of Nebraska, have invented a new and Improved Automobile-Jack, of which the following is a specification.

This invention has reference to improvements in that class of appliances or mechanisms used in garages for raising automobiles and sustaining them with their wheels from contact with the floor for relieving the tires from the weight of the car, and our said invention primarily has for its object to provide an automobile jack of a simple, compact and economical construction, in which the operation of passing the car onto the jack and raising it to the lifted position and holding it locked to such position, is automatically effected and in which the operated parts may be quickly adjusted to allow for backing the machine off the jack and onto the floor.

With other objects in view that will be hereinafter fully explained. our invention is an improved automobile jack that embodies the peculiar features of construction and novel combination of the parts to be explained in detail. specifically pointed out in the appended claims and illustrated in the accompanying drawings, in which:

Figure 1 is a perspective view of the jack, the parts being at the normal position ready for being engaged by the car to be suspended thereon.

Fig. 2 is a side elevation of our automobile jack, the parts being shown in the car sustaining position to which they are automatically set by the forward movement of the car, so much of the car as is necessary to illustrate the manner in which it adjusts the jack, being shown in dotted lines.

Fig. 3 illustrates the application of supplemental members used for effecting an additional lift of the car.

Fig. 4 is a detail perspective view of the locking or detent devices that coöperate with the pivoted drop legs, hereinafter specifically described.

Fig. 5 is a detail view of one of the double wedge blocks used for effecting the lift of the rear axle when moving the machine onto or backing off the jack frame.

In the practical arrangement, our improved automobile jack comprises a jack frame that consists of a pair of parallel side sills 1—1 that are connected at the front and rear ends by the cross members 2 and 3, and intermediate their ends, by a cross member 4, the several parts stated forming the body of the jack.

6—6 designate stops or abutments secured to the upper face of the sills 1—1 at the front ends thereof and 7 denotes a roller that extends transversely of the jack frame, and journals at its ends in bearings 70 on the under side of the rear ends of the sills 1—1, the front under sides of which are inclined or tapered toward their forward ends, as is indicated at 1ª—1ª, the purpose of which will presently appear.

8—8 designate a pair of drop legs and they are pivotally connected at their upper ends to the rear ends of the side sills 1—1, as is clearly shown in Figs. 1 and 4, from which it will be seen links or rods 81—81 are pivotally connected at one end to each of the legs 8 and have their outer or hook shape ends 82 slidable in eyes 9—9 on the sills 1, located forward of the said legs 8 and which limit the swing of the legs 8—8 when they are dropped to the vertical or jack frame sustaining position.

Latch members 10—10, at the end of the rods are pivotally connected to the legs 8—8 and are provided with a shoulder or detent portion 10ª for engaging the eyes 10ᵇ on the side sill, the said latches. when engaging the said eyes 10ᵇ, serving to hold the legs 8 from swinging back to their forward or lifted position, it being obvious that by tripping the latches out of locking engagement with the said eyes 10ᵇ, the said legs 8 may be readily swung up to the horizontal position and against the sides of the sills 1—1, as is clearly shown in Fig. 1.

11—11 designate wedge blocks tapered at their opposite ends and the said blocks are provided for being placed along side each of the legs 8 of the jack frame and in position for being engaged by the rear wheels of the car as the same passes forward over the said jack frame and thereby cause the rear wheels to rise from the floor as the car passes onto the jack.

13 designates a roller that is placed crosswise of the sills 1—1 and, when the parts are arranged for use, the said roller normally rests under the tapered or inclined lower edges of the front ends of the side sills 1—1, which ride over the said roller 13 when the car passes forwardly for engaging and bringing the jack to the operative position.

By reason of forming the jack frame in the manner stated, it will be apparent, from Fig. 1 of the drawing, that when the parts are at the normal position shown in Fig. 1, that when the car is driven over the lifter frame and the front axle comes in contact with the abutments 6—6 at the front ends of the sills 1—1, the motive power of the car drives the lifter frame forward over the roller 13 and raises the said frame until the inclined or tapered under edges of the wheels have passed over the roller 13, which raises the front end of the car from the floor.

As the car is driven on the jack frame, the rear wheels rise upon the wedge blocks 11—11 and, as the said rear wheels thus rise from the floor and the rear axle is correspondingly elevated above the rear end of the said jack frame, it follows that as the front axle engages the abutment 6 and rolls the frame over the roller 13, the weight of the front part of the car raises the rear end of the frame and, as the said rear end raises the legs 8—8 whose lower end slides along the floor, are caused to assume the vertical or locking position and thereby sustain the rear end of the frame at the elevated position, which now supports the rear axle of the vehicle with the rear wheels above the floor, it being understood that in passing down onto the down going end of the blocks 11—11, the rear wheels, while still in motion, clear themselves from the said blocks 11—11 and automatically, as it were, push the said blocks slightly backward, leaving the said wheels positioned as indicated in Fig. 2.

To provide for lifting the jack frame so as to elevate the car sufficiently to permit a mechanic to more conveniently do repair work, supplemental wedge blocks 15 are provided for being placed under the front end of the sills with their beveled ends 15a—15a held between the top of the roller 13 and the lower edges of the sills, and, when thus positioned, a further advancing of the car will tend to pull the jack frame forward and raise it to such additional height, see Fig. 3, that access to the mechanism under the car may be conveniently had.

It is understood that the lifter frame may be made of different lengths suitable for different lengths of cars.

From the foregoing description taken in connection with the accompanying drawings, the complete construction, the manner in which our automobile jack is used and the advantages thereof will be readily apparent to those skilled in the art to which the said invention relates.

While the arrangement of the parts shown and described discloses a practical application of our invention, it is understood that such changes in the details of construction may be made as properly come within the scope of the appended claims.

For example instead of using the wedge block 11—11 for lifting the rear axle and the wheels, an ordinary lifting jack may be used to raise the rear end to allow the legs 8—8 to drop to a vertical position and support the rear end of the lifter frame and maintain the same in a level position.

To back the car out, the wedge blocks 11—11 are placed slightly under the rear wheels and the detent that holds the legs locked to their vertical position is released. As the car backs onto the blocks 11—11 and weight is off the rear end of the lifter frame, the said end lifts the legs 8—8 from the floor; in continuing backing off, as the rear wheels pass down and from the blocks 11—11, the legs 8—8 (the latches having been dropped) again come into contact with the floor forcing the legs to fold up to the first position shown in Fig. 1, leaving the jack in position to again drive on.

Our jack frame is not a stationary one and the weight of the lifter frame is such that it can be easily moved from place to place by one man.

What we claim is:

1. A vehicle jack comprising a lifter frame, a free bearing roller disposed transversely of the frame and on which the front end of the frame is supported for riding thereon, abutments on the front end of the frame to be engaged by the vehicle axle to move the frame forwardly under the power of the vehicle, the front part of the frame that engages the bearing roller being inclined whereby, as it moves forwardly with the bearing roller and rides over the said bearing roller, the front end will be elevated and the said frame thereby adapted to rock on the said roller as a fulcrum, whereby the rear end of the frame is elevated, and a drop support for the rear end of the frame when elevated, said drop support adapted to engage the ground and hold the frame against rolling movement on the bearing roller, said bearing roller adapted to roll on the ground as the frame is moved forwardly, said bearing roller and said drop support adapted to hold said frame in the elevated position.

2. A vehicle jack, comprising a lifter frame, a roller disposed transversely of the frame and on which the front end of the frame is supported for riding thereon, abutments on the front end of the frame for being engaged by the vehicle axle to move the frame forwardly under the power of the vehicle, the front part of the frame that engages the roller being inclined, whereby, as it is rolled forwardly the front end will be elevated, and supplemental members having wedge-like ends adapted for being projected between the roller and the frame members that ride on the roller to provide for a supplemental lift of the front end of the vehicle.

3. A vehicle jack, comprising a lifter frame, a roller disposed transversely of the frame and on which the front end of the frame is supported for riding thereon, abutments on the front end of the frame for being engaged by the vehicle axle to move the frame forwardly under the power of the vehicle, the front part of the frame that engages the roller being inclined, whereby, as it is rolled forwardly the front end will be elevated, the said frame being adapted to rock on the said roller as a fulcrum, whereby the rear end of the frame is elevated, and means for sustaining the rear end of the frame when in the elevated position, the said means including legs loosely pivoted on the sides of the frame that drop to the floor when the rear end of the frame is elevated, and a detent device for each leg that automatically moves to a locked engagement when the legs drop to the vertical position, whereby to hold the legs locked to the said vertical position.

4. A vehicle jack, comprising a lifter frame, a roller disposed transversely of the frame and on which the front end of the frame is supported for riding thereon, abutments on the front end of the frame for being engaged by the vehicle axle to move the frame forwardly under the power of the vehicle, the front part of the frame that engages the roller being inclined, whereby, as it is rolled forwardly the front end will be elevated, the said frame being adapted to rock on the said roller as a fulcrum, whereby the rear end of the frame is elevated, and means for sustaining the rear end of the frame when in the elevated position, the said means including legs loosely pivoted on the sides of the frame that drop to the floor when the rear end of the frame is elevated, and a detent device for each leg that automatically moves to a locked engagement when the legs drop to the vertical position, whereby to hold the legs locked to the said vertical position, and a pair of trackway sections having their opposite ends inclined downwardly, one of the said sections being placeable adjacent each supporting leg at the back end of the frame for relieving the rear end of the lifting frame of the weight of the vehicle as the said vehicle passes onto and off the lifter frame, to thereby permit the legs to freely swing on their pivots.

5. A vehicle jack comprising in combination with a single shiftable bearing roller; a lifter frame adapted to be rolled over and along with the bearing roller by the oncoming vehicle and to be thereby rendered operative to lift the vehicle from the floor and a means on the rear end of the frame for holding said rear end in its elevated position and restraining the frame from further movement on the bearing roller, said bearing roller adapted to roll on the ground as the frame is moved forwardly and adapted to hold the front end of the frame elevated from the ground, said roller being located in advance of the center of gravity of the frame when said rear end holding means is in engagement with the ground.

6. A vehicle jack comprising in combination with a shiftable free bearing roller; a lifter frame adapted to be rolled over and along with the bearing roller by the oncoming vehicle and to be thereby rendered operative to lift the vehicle from the floor, a device that comes into action as the lifter frame is elevated and is rocked on the bearing roller for holding the frame to its vehicle lifting position and holding the frame against further rolling motion, said bearing roller adapted to lie in advance of the center of gravity of the frame and sustaining the front end of the frame in the elevated position while said device holds the rear end of the frame in the elevated position substantially as shown and described.

FREDERICK PREIFERT.
FERDINAND SCHULZ.

Copies of this patent may be obtained for five cents each, by addressing the "Commissioner of Patents, Washington, D. C."